Oct. 13, 1925.
S. PESTUNOWITZ
CUSHION TIRE
Filed Oct. 1, 1924
1,557,324
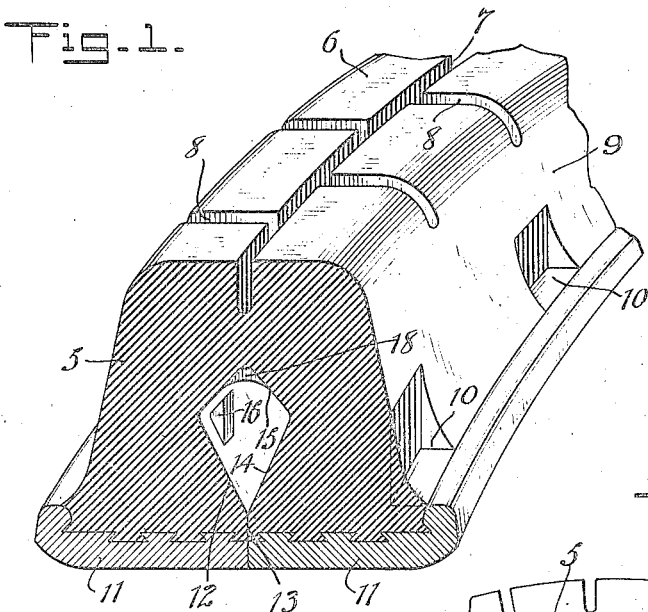
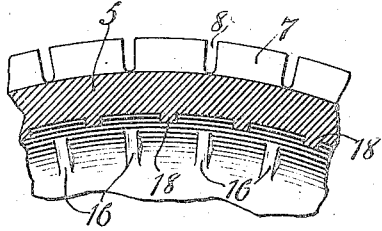
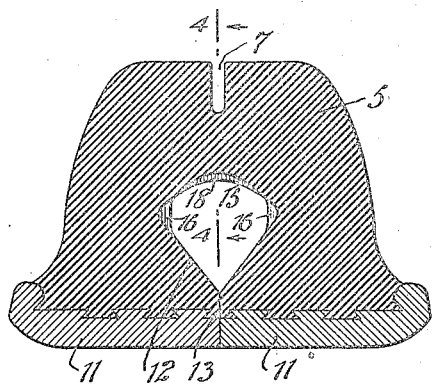
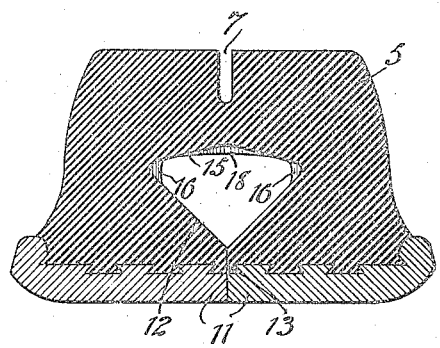
WITNESSES
INVENTOR
Samuel Pestunowitz
BY
ATTORNEYS Patented Oct. 13, 1925.

1,557,324

UNITED STATES PATENT OFFICE.

SAMUEL PESTUNOWITZ, OF NEWARK, NEW JERSEY.

CUSHION TIRE.

Application filed October 1, 1924. Serial No. 741,017.

*To all whom it may concern:*

Be it known that I, SAMUEL PESTUNOWITZ, a citizen of the United States, and a resident of Newark, in the county of Essex and State of New Jersey, have invented a new and Improved Cushion Tire, of which the following is a full, clear, and exact description.

The present invention relates to new and useful improvements in resilient tires, and it pertains more particularly to tires of the cushion type.

It is one of the primary objects of the invention to provide a cushion tire in which a maximum amount of resiliency will be had under the strain of a minimum load.

It is a further object of the invention to construct a resilient cushion tire in such a manner that when the same is subjected to the action of heavy loads the resiliency of the tire will be substantially uniform or of the same degree as when the tire is used for supporting relatively lighter loads.

It is a further object of the invention to construct the tire in such a manner that compression or supporting means are brought into play when the tire is subjected to heavy strains which means are normally inactive when the tire is subjected to light strains as in the act of supporting relatively light loads.

With the above and other objects in view, reference is had to the accompanying drawings, in which Fig. 1 is a perspective view, partly in section, of a cushion tire constructed in accordance with the present invention, the tire being shown in position upon a rim;

Fig. 2 is a transverse sectional view of the tire showing the position it assumes in the supporting of relatively light loads;

Fig. 3 is a similar view showing the tire further compressed or in the position it assumes when supporting relatively heavy loads;

Fig. 4 is a detail circumferential sectional view of a tire constructed in accordance with the present invention.

Referring more particularly to the drawings, the reference numeral 5 designates the body of the tire and 6 designates the tread. Extending circumferentially of the tread portion 6 there is a channel 7 and leading from said channel 7 there is a plurality of laterally extending channels 8 staggered with respect to one another. The side walls 9 of the tire 5 are provided at spaced intervals with recesses 10, which serve to aid in cooling the tire or dissipating the heat thereof due to road friction. The tire is supported by a suitable rim comprising two sections 11 which may be held together upon a wheel or felly band in any desired manner.

Extending circumferentially of the tire there is a space or passage 12 which is substantially diamond-shaped in cross sectional form, and the inner circumferential face of the tire is split as at 13 in order that the core of the mold in which the tire is formed, which core is employed to form the space 12, may be removed. This space has a plurality of angular side walls 14 and angular side walls 15, of which the angular side walls 14 are the longer and at spaced intervals, and connecting the side walls 14 and 15 there is a plurality of lugs 16 more clearly shown in Fig. 4. These lugs 16 in addition to aiding in supporting the load, also prevent contacting of the walls 14 and 15, thus eliminating friction between these walls.

The angularly disposed walls 15 are connected by means of transversely extending lugs or webs 18, as more clearly shown in Figs. 1 and 4, and such lugs or webs 18 serve to lend rigidity to the tire.

The tire functions in the following manner: When the same is employed to support relatively light loads, the compression of the tire is such as shown in Fig. 2 and the resiliency afforded is provided mainly by the resiliency of the rubber between the top of the space 12 and the tread portion of the tire, the distorting of the space 12 being relatively slight. When, however, the tire is employed to support relatively heavy loads, the same assumes the cross-sectional position shown in Fig. 3, in which position the lugs 16 are placed under compression to aid in supporting the heavy load and the lugs or webs 18 are stretched or placed under tension, which also serves to aid in supporting the load, thus giving a maximum amount of resiliency in this position.

While in the present illustration of the invention, the side walls 14 and 15 of the space 12 are shown as constituting but two angles, it is obvious that more angles may be provided if desired without departing from the invention.

From the foregoing it is apparent that the present invention provides a cushion tire in which a maximum amount of resiliency is had regardless of the weight supported thereby, and, furthermore, the tire is capable of supporting relatively light and heavy loads with equal facility.

It is apparent from the above that all of the objects of the present invention have been accomplished, and, further, it should be understood that numerous modifications of structure might readily be resorted to without in the least departing from the scope of the claims.

What is claimed is:

1. A resilient tire comprising a circular body of resilient material having a circumferentially extending space, the side walls of which are angularly disposed, resilient portions bridging the junctures of said walls, there being a series of radially disposed resilient portions at each side of the body with the portions of one series similarly arranged opposite those of the other series, and a series of transversely disposed resilient portions which occur in a staggered relationship with respect to the radially disposed resilient portions.

2. A resilient tire comprising a circular body of resilient material having an internal circumferentially extending chamber, the walls of which are in angularly disposed relation, a plurality of radially disposed lugs bridging certain of the angles of said angularly disposed walls, and transversely extending lugs bridging other angles of the walls, all of said lugs serving to restrict the compression of the tire beyond a predetermined point.

3. A resilient tire comprising a circular body of resilient material having an internal circumferentially extending chamber, the walls of which are in angularly disposed relation, a plurality of radially disposed lugs bridging certain of the angles of said angularly disposed walls and transversely extending lugs bridging other angles of the walls, all of said lugs being an integral portion of the resilient material forming the body and serving to restrict the compression of the tire beyond a predetermined point.

SAMUEL PESTUNOWITZ.